United States Patent [19]

Rosthauser et al.

[11] Patent Number: 4,728,711
[45] Date of Patent: Mar. 1, 1988

[54] SWELLABLE COATING COMPOSITIONS

[75] Inventors: James W. Rosthauser, Imperial; Peter H. Markusch, McMurray, both of Pa.

[73] Assignee: Mobay Corporation, Pittsburgh, Pa.

[21] Appl. No.: 816,530

[22] Filed: Jan. 6, 1986

[51] Int. Cl.$^4$ .................... C08G 18/28; C08G 18/77
[52] U.S. Cl. .................................. 528/73; 528/75; 524/871
[58] Field of Search ............... 528/73, 75; 524/871

[56] References Cited

U.S. PATENT DOCUMENTS

| | | | |
|---|---|---|---|
| 3,509,016 | 4/1970 | Underwood et al. | 161/190 |
| 3,563,846 | 2/1971 | Harr | 161/161 |
| 3,698,587 | 10/1972 | Baker et al. | 220/9 F |
| 4,039,489 | 8/1977 | Fletcher et al. | 260/2.5 |
| 4,396,053 | 8/1983 | Davis | 152/347 |

Primary Examiner—Morton Foelak
Assistant Examiner—M. L. Moore
Attorney, Agent, or Firm—Gene Harsh; Joseph C. Gil; Lyndanne M. Whalen

[57] ABSTRACT

The present invention is directed to a coating composition produced by reacting an organic isocyanate with an active hydrogen containing organic material at an isocyanate group to active hydrogen ratio of from 1:1 to 2:1, said composition:
 (i) capable of swelling at least 300% by volume at a film thickness of 3 mils or less within 5 minutes after immersion in a hydrocarbon solvent,
 (ii) having a heteroatom content of from 1 to 12% by weight based on the total weight of the composition, and
 (iii) having a mean chain length between cross-linking sites of at least 4000.

5 Claims, No Drawings

SWELLABLE COATING COMPOSITIONS

BACKGROUND OF THE INVENTION

Elastomeric polyurethane coating compositions are of some technical interest. One application area for these coatings would be as a spray-applied fuel bladder for military aircraft. One of the major requirements for this type of coating would be that it swell rapidly when it comes into contact with jet fuel. Further requirements are that it should have good tear strength and a good tensile at relatively high elongation. The material must be able to seal leaks in the fuel tank when the tank is pierced by a projectile or when vibrations of the aircraft cause a rupture of the tank.

Currently, fuel bladders are fabricated in a mold rather than spray applied into the fuel tank. The fabrication process is labor-intensive, hence the cost of the bladders is relatively high. Also, the failure rate of the fabricated bladders at time of installation is rather high. The bladders are collapsed and pulled through a small opening leading to the aircraft's fuel tank in the fuselage and subsequently "sewn" into place. Typical of prior art techniques are those described in U.S. Pat. Nos. 3,509,016, 3,563,846 and 3,698,587.

It would be desirable to replace the fabricated bladder system with a more cost effective one which could be spray applied directly into or onto the fuel tank. Not only would manufacturing and installation costs be lowered, but also the overall fuel capacity would be increased.

Slightly vulcanized (lightly cross-linked) natural gum rubber is presently used for the "swellable" portion of fabricated fuel bladders. This material is tough and swells rapidly in contact with jet fuel, but it is insoluble in coating solvents and thus cannot be applied using conventional coating methods.

Elastomeric, linear polyurethanes are known to swell in hydrocarbon solvents. Most published data reports the extent of polymer swelling after the swollen pieces have reached an optimum (equilibrium) value. In most cases, this does not occur rapidly, but rather over a 2 to 4 day period. This time period is much too long to be practical for the "self-healing fuel tank" application. The polymer must reach an optimum swelling value within a five-minute time frame.

Finally, a variety of different compositions are known which are based on polyisocyanates and hydroxy-terminated polybutadienes (see, e.g., U.S. Pat. Nos. 4,039,489 and 4,396,053).

DESCRIPTION OF THE INVENTION

The present invention is directed to a coating composition which is eminently suitable for use in coating fuel tanks.

The coating composition of the present invention is produced by reacting an organic isocyanate with an active hydrogen containing organic material at an isocyanate group to active hydrogen ratio of from 1:1 to 2:1, preferably from 1:1 to 1.5:1 and most preferably from 1:1 to 1.2:1, with the composition characterized as
 (i) capable of swelling at least 300% by volume at a film thickness of 3 mils or less within 5 minutes after immersion in a hydrocarbon solvent,
 (ii) having a heteroatom content of from 1 to 12% by weight, preferably 2 to 6% by weight, and most preferably 2 to 4% by weight, based on the total weight of the composition, and
 (iii) having a mean chain length between cross-linking sites ($M_c$) of at least 4,000, and preferably at least 20,000.

As used herein, the term "heteroatom" means oxygen, nitrogen or sulfur atoms. The percentage of heteroatoms can be calculated by solving the equation:

$$\% \text{ heteroatom} = \frac{wt(O + N + S)}{wt(C + H + O + N + S)}.$$

The mean chain length between cross-linking sites (Mc) is calculated according to the method of Bolin, described in "Journal Chem. & Eng. Data", Vol. 4, No. 3, July 1959, page 261.

The compositions of the present invention are produced by reacting an organic isocyanate with an active hydrogen containing organic material.

Substantially any isocyanate and any active hydrogen containing material can be used provided the resultant product has the heteroatom contents and mean chain length between cross-linking sites noted above.

Preferred active hydrogen containing materials are polymers having molecular weights up to 100,000 or more. However, since such polymers are fairly viscous, they are more difficult to homogeneously disperse and cross-link. Liquid polymers having molecular weights from 1,000 to 6,000 and preferably 2,000 to 3,000 are most effective in this invention. Representative polymers include polymers or copolymers of $C_2$ to $C_4$ monounsaturated aliphatic hydrocarbon monomers such as polyethylene, polypropylene, polybutylene, ethylenepropylene, of $C_4$ to $C_8$ dienes such as polybutadiene, polyisoprene, polypentadiene, polyhexadiene, or hydrogenated derivatives thereof. Preferred hydrocarbon polymers are the hydrogenated or unhydrogenated liquid polymeric butadienes which are readily available with functional groups such as hydroxyl, amino or carboxyl and most preferably those having from about 1.7 to 2.5 hydroxy groups per polymer molecule.

The coating composition may contain some trifunctional cross-linking agent but if it does, it must also contain a difunctional curing agent and a monofunctional modifier to control cross-linking and chain extension. A catalyst may also be present to accelerate polymerization.

Particularly useful isocyanates include isophorone diisocyanate, dodecyl benzene diisocyanate, dimeryl diisocyanate, isocyanate-terminated prepolymers, so-called modified isocyanates, and the like.

Any known urethane catalyst can be utilized to promote the reaction. Such materials include ferric acetyl acetone, stannous octoate, dibutyl tin dilaurate and the like. Cure can even be achieved without any catalyst. The catalyst, however, as is well known, assures a more rapid cure.

An objective of the invention is to get as little cross-linking to occur in the polymer network as possible. Several different approaches can be utilized to accomplish the minimal cross-linking desired. Depending upon the approach utilized, a product having somewhat different characteristics will result. In order to reduce the cross-linking concentration, one can reduce the functionality of the cross-linking agent, for example, by adding a monofunctional isocyanate.

An additional approach to limiting the cross-linking is through the addition of a monofunctional ingredient such as 1-decanol or isocetyl alcohol which serves to terminate branching chains instead of allowing them to join other chains.

The coating composition of the invention can be used for many applications including automobile gas tanks, fuel tanks for military vehicles, fuel storage tanks, underground fuel storage tanks and lines, and the like.

The following specific examples will give an indication of specific formulated polymer systems that can be formulated within the concept of the invention and are merely illustrative of the approach that can be taken within the broad spectrum of possibilities that exist within the polymeric art to achieve the herein results.

The invention is further illustrated, but is not intended to be limited by the following examples in which all parts and percentages are by weight unless otherwise specified.

EXAMPLES

EXAMPLES 1 through 5

An hydroxyl functional poly(butadiene) adduct with an average equivalent weight of 1204 based on hydroxyl group content, (Poly BD R-45HT, Arco Chemical Company), was combined with dimeryl diisocyanate with an average weight of 300 based on isocyanate content, (DDI 1410, Henkel Corporation), in varying ratios as listed in Table I. A 10% solution of dibutyl tin dilaurate in 2-butoxyethyl acetate was added to the solutions so that the concentration of catalyst was approximately 1.0% based on resin weight. Sufficient xylene was added to adjust the solid content of the compositions to about 58.0%. The mean chain length between cross-linking ($M_c$) and the percent heteroatoms were as indicated in Table I.

TABLE I

| Example | DDI 1410 Wt., (grams) | Poly BD R-45HT Wt., (grams) | NCO/OH Ratio | $M_c$ (calculated) | % Heteroatom (calculated) |
|---|---|---|---|---|---|
| 1 | 7.20 | 24.10 | 1.20 | 36,300 | 3.3 |
| 2 | 9.00 | 24.10 | 1.50 | 38,000 | 3.6 |
| 3 | 10.80 | 24.10 | 1.80 | 40,000 | 4.0 |
| 4 | 12.00 | 24.10 | 2.00 | 41,900 | 4.2 |
| 5 | 6.60 | 24.10 | 1.10 | 35,600 | 3.2 |

EXAMPLE 6

24.10 parts by weight of a hydroxyl functional poly(butadiene) adduct with an average equivalent weight of 1204 based on hydroxyl group content, (Poly BD R-45HT, Arco Chemical Company), was combined with 2.44 parts by weight of isophorone diisocyanate, average equivalent weight 111. 1.33 parts by weight of a 10% solution of dibutyl tin dilaurate in 2-butoxyethyl acetate was added to the solution so that the concentration of catalyst was approximately 0.05% based on resin weight. The mean chain length between cross-linking sites ($M_c$) was about 4500 while the heteroatom content was 3.7%. 10.00 parts by weight of xylene was added to adjust the solid content of the composition to about 60.0%.

EXAMPLE 7

35.20 parts by weight of a hydroxyl functional poly(butadiene) adduct with an average equivalent weight of 1204, based on hydroxyl group content, and 0.40 parts by weight of 1,4-butanediol, average equivalent weight 45, was combined with 6.30 parts by weight of a biuret of hexamethylene diisocyanate, with an average equivalent weight of 180 based on isocyanate content, (Desmodur L-2291-A, Mobay Chemical Corporation). 0.23 parts by weight of a 10% solution of dibutyl tin dilaurate in 2-butoxyethyl acetate was added to the solution so that the concentration of the catalyst was approximately 0.05% based on resin weight. 30.19 parts by weight of xylene was added to adjust the solid content of the composition to about 60.0%.

EXAMPLE 8

Into a 500 ml, three neck flask equipped with stirrer, thermometer, and condenser (fitted with a drying tube filled with anhydrous calcium sulfate) was added 133.0 parts by weight of a biuret of hexamethylene diisocyanate with an average equivalent weight of 190 based on isocyanate content (Desmodur N-100, Mobay Chemical Corporation). To this was added 84.7 parts by weight of isocetyl alcohol (average equivalent weight 242). The material was then heated to a temperature of 90° C. for approximately 1 hour after which the isocyanate content was determined to be 6.20%. To this 93.3 parts by weight of xylene was added to adjust the solids content of the composition to approximately 70.0%. The mixture was stirred for approximately 1 hour at ambient temperature and then allowed to cool to room temperature. The resulting product was a clear yellow liquid with a viscosity of 280 mPa.s at 25° C., and an isocyanate content of 4.11%. 28.0 parts by weight of this material, with an average equivalent weight of 1021.9 based on isocyanate content, was combined with 30.0 parts by weight of a hydroxyl functional poly(butadiene) adduct with an average equivalent weight of 1204 based on hydroxyl group content (Poly BD R-45HT, Arco Chemical Company). 5.0 parts by weight of a 10% solution of dibutyl tin dilaurate in 2-butoxyethyl acetate was added to the solution so that the composition of catalyst was approximately 1.0% based on resin weight, and 24.7 parts by weight of xylene was added to adjust the solids content to about 60.0%.

EXAMPLE 9

Into a 500 ml, three neck flask equipped with stirrer, thermometer and condenser (fitted with a drying tube filled with anhydrous calcium sulfate) was added 160.0 parts by weight of a 60% solids solution of the adduct of 3 moles of toluene diisocyanate with 1 mol of trimethylolpropane with an average equivalent weight of 400 based on an isocyanate content (Mondur CB-60, Mobay Chemical Corporation). Added to this was 48.4 parts by weight of isocetyl alcohol (average equivalent weight 242). The material was then heated to a temperature of 90° C. for approximately 1 hour, after which the isocyanate content was determined to be 3.91%. At this point the reaction was stopped and the material was allowed to cool to room temperature. The resulting product was a clear yellow liquid with a viscosity of 5600 mPa.s, and an isocyanate content of 3.81%.

24.2 parts by weight of this material, with an average equivalent weight of 1102 based on isocyanate content, was combined with 24.1 parts by weight of a hydroxyl functional poly(butadiene) adduct with an average equivalent weight of 1204 based on hydroxyl group content (Poly BD R-45HT, Arco Chemical Company). To this was added 4.1 parts by weight of a 10% solution of dibutyl tin dilaurate in 2-butoxyethyl acetate so that the concentration of catalyst was approximately 1.0% based on resin weight, and 19.7 parts by weight of xylene was added to adjust the solid content to about 60.0%.

Coatings of the materials described in Examples 1 through 9 were prepared on glass plates by using a 10 mil wet film thickness drawdown bar. The coatings were allowed to cure overnight at ambient temperatures and then heat aged 1 hour at 80° C. The coatings were then removed from the glass plates and cut into 1.00 square inch pieces. The pieces were then submersed into a hydrocarbon solution (40% isooctane, 25% toluene, 35% cyclohexane, based on volume), and the length of the pieces were measured after 30, 60, 120, and 300 seconds. The percent swelling was calculated according to the following equation and was recorded in Table II:

$$\% \text{ volume swell} = \frac{(\text{length of swollen piece})^3 - (1.00)^3}{(1.00)^3} \times 100$$

TABLE II

| Example | % SWELLING AFTER (seconds) | | | |
| --- | --- | --- | --- | --- |
| | 30 | 60 | 120 | 300 |
| 1 | 309.60 | 309.60 | 349.20 | 349.20 |
| 2 | 309.60 | 349.20 | 391.30 | 391.30 |
| 3 | 309.60 | 349.20 | 391.30 | 391.30 |
| 4 | 309.60 | 349.20 | 349.20 | 349.20 |
| 5 | 391.30 | 435.90 | 435.90 | 435.90 |
| 6 | 272.00 | 349.00 | 483.00 | 533.00 |
| 7 | 146.04 | 237.50 | 309.60 | 309.60 |
| 8 | 237.50 | 309.60 | 309.60 | 309.60 |

TABLE II-continued

| Example | % SWELLING AFTER (seconds) | | | |
| --- | --- | --- | --- | --- |
| | 30 | 60 | 120 | 300 |
| 9 | 309.60 | 309.60 | 349.20 | 349.20 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition produced by reacting an organic isocyanate with an active hydrogen containing organic material at an isocyanate group to active hydrogen ratio of from 1:1 to 2:1, said composition:
   (i) capable of swelling at least 300% by volume at a film thickness of 3 mils or less within 5 minutes after immersion in a hydrocarbon solvent,
   (ii) having a heteroatom content of from 1 to 12% by weight based on the total weight of the composition, and
   (iii) having a mean chain length between cross-linking sites of at least 4000.

2. The composition of claim 1 wherein said mean chain length is at least 20,000.

3. The composition of claim 2, wherein said heteroatom content is from 2 to 6% by weight.

4. The composition of claim 3, wherein said heteroatom content is from 2 to 4% by weight.

5. The composition of claim 1 wherein said isocyanate is dimeryl diisocyanate and said organic material is a hydrogenated or unhydrogenated liquid polybutadiene containing hydroxyl groups.

* * * * *